US006802980B1

(12) United States Patent
Khandaker et al.

(10) Patent No.: US 6,802,980 B1
(45) Date of Patent: Oct. 12, 2004

(54) ARSENIC REMOVAL IN CONJUNCTION WITH LIME SOFTENING

(75) Inventors: Nadim R. Khandaker, Albuquerque, NM (US); Patrick V. Brady, Albuquerque, NM (US); David M. Teter, Edgewood, NM (US); James L. Krumhansl, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 145 days.

(21) Appl. No.: 10/231,967

(22) Filed: Aug. 30, 2002

Related U.S. Application Data

(63) Continuation-in-part of application No. 10/127,887, filed on Apr. 23, 2002, which is a continuation-in-part of application No. 09/886,175, filed on Jun. 20, 2001.

(51) Int. Cl.[7] ................................................. C02F 1/58
(52) U.S. Cl. ...................... 210/724; 210/726; 210/747; 210/911
(58) Field of Search ................................. 210/702, 716, 210/717, 723, 724–727, 911, 747

(56) References Cited

U.S. PATENT DOCUMENTS

| | | | | |
|---|---|---|---|---|
| 4,622,149 A | * | 11/1986 | Devuyst et al. ............. | 210/717 |
| 4,761,239 A | * | 8/1988 | Wardell ...................... | 210/727 |
| 5,348,662 A | * | 9/1994 | Yen et al. ................... | 210/717 |
| 5,510,108 A | * | 4/1996 | Chouraqui .................. | 424/408 |
| 5,556,545 A | | 9/1996 | Volchek et al. | |
| 6,120,698 A | * | 9/2000 | Rounds et al. .............. | 252/181 |
| 6,248,369 B1 | * | 6/2001 | Nier et al. ................... | 424/637 |

FOREIGN PATENT DOCUMENTS

JP    6-304573    11/1994

OTHER PUBLICATIONS

Benefield, L.D., et al., "Chemical Precipitation, Water Quality and Treatment: A Handbook of Community Water Supplies," *American Water Works Association*, Fifty Edition, pp 10.1–10.60 (1999).
McNeill, L.S., et al., "Arsenic Removal by Precipitative Softening," *Critical Issues in Water and Wastewater Treatment: Proceed. Of 1994 ASCE Natl Conf on Environmental Eng.*, Gennewich, Conn; Braun–Brumfield Publ (1994).
McNeill, L.S., et al., "Arsenic Removal During Precipitative Softening," *J of Environmental Eng.*, pp 452–460 (May 1997).
McNeil, L.S., "Understanding Arsenic Removal During Conventional Water Treatment," Master's Thesis, University of Colorado, Boulder (1996).
National Drinking Water Clearinghouse, Fact Sheet Lime Softening, Tech Brief Eight, pp 1–4 (Jun. 1998).

* cited by examiner

*Primary Examiner*—Peter A. Hruskoci
(74) *Attorney, Agent, or Firm*—Jeff Myers; Robert Watson

(57) ABSTRACT

A method for removing dissolved arsenic from an aqueous medium comprising adding lime to the aqueous medium, and adding one or more sources of divalent metal ions other than calcium and magnesium to the aqueous medium, whereby dissolved arsenic in the aqueous medium is reduced to a lower level than possible if only the step of adding lime were performed. Also a composition of matter for removing dissolved arsenic from an aqueous medium comprising lime and one or more sources of divalent copper and/or zinc metal ions.

30 Claims, 1 Drawing Sheet

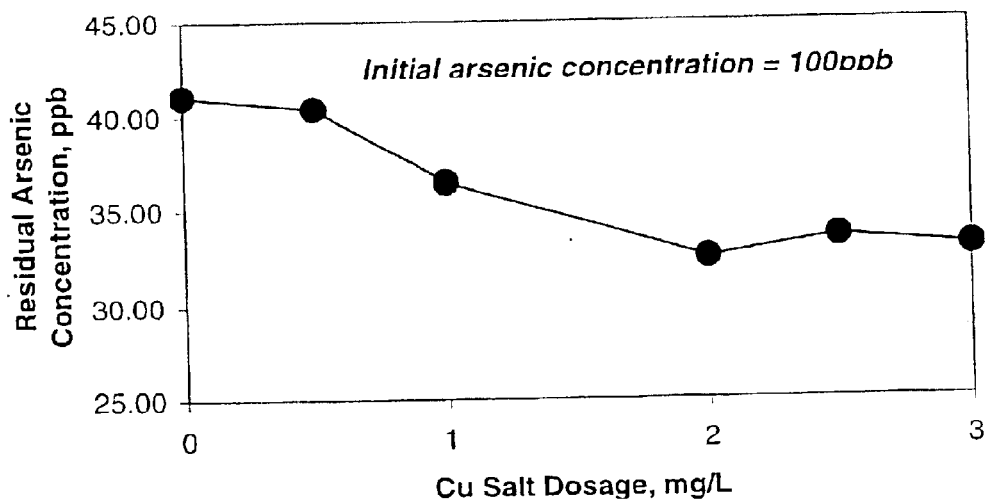
Figure 1. Residual Arsenic Concentration With Fixed Lime Dosage of 10 mg/L and Varing Cu Salt Dose
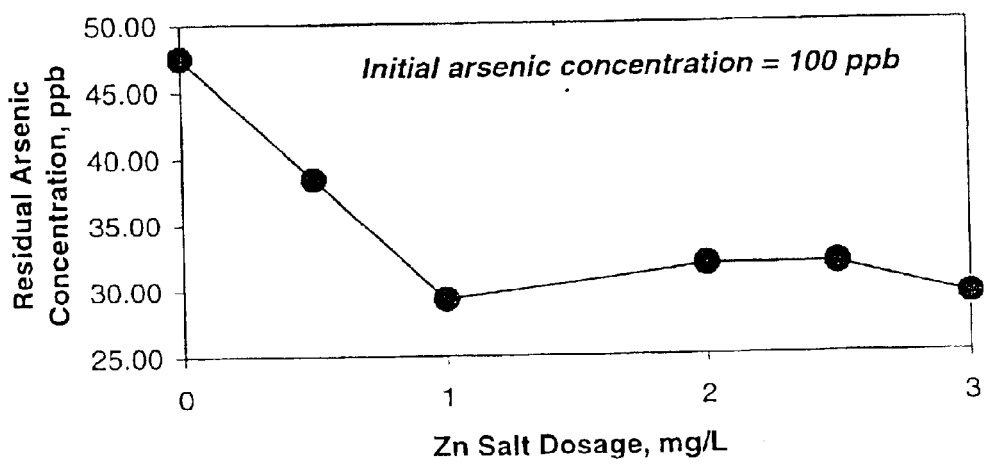
Figure 2. Residual Arsenic Concentration With Fixed Lime Dosage of 10 mg/L and Varing Zn Salt Dose

ARSENIC REMOVAL IN CONJUNCTION WITH LIME SOFTENING

CROSS-REFERENCE TO RELATED APPLICATIONS

This application is a continuation-in-part application of U.S. patent application Ser. No. 10/127,887, entitled "Enhanced Coagulation for Anion Removal", to David M. Teter, et al., filed on Apr. 23, 2002, which was a continuation-in-part application of U.S. patent application Ser. No. 09/886,175 entitled "Inorganic Ion Sorbents and Methods for Using the Same", to David M. Teter, et al., filed on Jun. 20, 2001, and the specifications thereof are incorporated herein by reference.

GOVERNMENT RIGHTS

The Government has rights to this invention pursuant to Contract No. DE-AC04-94AL85000 awarded by the U.S. Department of Energy.

BACKGROUND OF THE INVENTION

1. Field of the Invention (Technical Field)

The present invention relates to removal of arsenic from water, particularly during otherwise conventional lime softening water treatment processes.

2. Background Art

Note that the following discussion refers to a number of publications by author(s) and year of publication, and that due to recent publication dates certain publications are not to be considered as prior art vis-a-vis the present invention. Discussion of such publications herein is given for more complete background and is not to be construed as an admission that such publications are prior art for patentability determination purposes.

Arsenic has long been known as a highly toxic element. Arsenic exists in two soluble and dangerous oxidation states, $As^{3+}$, which is known as arsenite, and $As^{5+}$, which is known as arsenate. Both forms are toxic and exist in groundwater, surface water, and wastewater.

Conventionally various techniques have been examined to remove As from water, such as precipitation (e.g., salts of iron, aluminum, or copper) and coagulation and filtration processes. However, these conventional methods are generally unable to successfully remove the As to lower levels due to the affinity and solubility limitation of the resultant products. The procedures are also time-consuming and expensive, and so not cost-effective.

One method for removing arsenic species from an aqueous medium is the use of an alumina sorbent, as discussed in U.S. Pat. No. 5,556,545, to Volchek, et al. However, the method has some inherent limitations, requiring regeneration and conditioning of the sorbent. Therefore, this regeneration process creates a hazardous solution. Furthermore, the regeneration process results in loss of the sorbent, thus increasing the cost of using activated alumina as a method for removing arsenic from an aqueous medium.

Another method to remove arsenic species from an aqueous medium is ion exchange. One of the disadvantages of this process is that the ion-exchangers utilized are mostly synthetic resins and hence are very expensive. See, e.g., Japanese Patent Application Publication No. H06-304573, to Masafumi, et al. Furthermore, few resins are selective in arsenic removal. A variety of anions such as sulfates compete for the ion-exchange sites in the resin. In general, ion-exchange is not a feasible method of removing arsenic from an aqueous medium if the medium contains a high level of dissolved solids or sulfate concentrations.

Another method for removing arsenic species from an aqueous medium is through the use of a membrane process. A membrane process involves passing the aqueous medium through the membrane to filter the selected material. However, membrane processes are costly as a method for removing arsenic species from an aqueous medium.

Another recently disclosed method is the use of zirconium hydroxide as a paste in water filters, as disclosed in U.S. Pat. No. 6,383,395, to Clarke, et al. The media includes a material selected from zirconium hydroxide, titanium hydroxide, hafnium hydroxide and combinations thereof. The media is preferably in powder form while used to treat water. The media needs to be regenerated repeatedly in order to reduce the cost, while it creates hazardous solutions that need to be disposed of at a cost. Because the media used is in the form of a paste, it does not have high hydraulic permeability and requires use at high pressure. This significantly limits the use of the material to small, high-pressure systems.

Lime softening is employed to remove excess calcium and magnesium from drinking water Upon addition of lime (CaO (quicklime) or $Ca(OH)_2$ (hydrated lime)), calcium carbonate ($CaCO_3$) and magnesium hydroxide ($Mg(OH)_2$, precipitates form that are subsequently removed through microfiltration or by conventional settling followed by filtration. See, generally, "Lime Softening", National Drinking Water Clearinghouse Tech Brief Eight (1998). Typically, to precipitate out calcium carbonate the pH must be increased to 10.0; to precipitate magnesium hydroxide requires a pH of 10.5. L. D. Benefield, et al., *Chemical Precipitation, Water Quality and Treatment: A Handbook of Community Water Supplies*, American Water Works Association, Fifth Edition, Pages 10.1–10.60 (1999). Low carbonate waters require the addition of soda ash —$Na_2CO_3$— as well. Lime softening removes some arsenic from water—approximately 5–33% at pH 10 where calcite forms. L. S. McNeill, "Understanding Arsenic Removal During Conventional Water Treatment", Master's thesis, University of Colorado, Boulder (1996). Greater arsenic removal with lime softening typically requires the higher pH of magnesium hydroxide formation as well as the presence of ferric chloride. L. S. McNeill, et al., "Arsenic Removal by Precipitative Softening", in *Critical Issues in Water and Wastewater Treatment: Proceedings of the* 1994 *ASCE National Conference on Environmental Engineering*, Greenwich, Conn.: Braun-Brumfield Publishers (1994). The difficulty and cost of raising drinking water pH to 10 5, adding ferric chloride, and readjusting the pH down to near neutral prevents the widespread use of lime softening for arsenic removal.

The present invention improves arsenic removal by lime softening and does so at lower pH. This is accomplished through addition of divalent metal ions other than calcium or magnesium, most preferably zinc and/or copper.

SUMMARY OF THE INVENTION (DISCLOSURE OF THE INVENTION)

The present invention is of a method for removing dissolved arsenic from an aqueous medium, comprising: adding lime to the aqueous medium; and adding one or more sources of divalent metal ions other than calcium and magnesium to the aqueous medium; whereby dissolved arsenic in the aqueous medium is reduced to a lower level than possible if only the step of adding lime were performed.

In the preferred embodiment, adding lime increases pH of the aqueous medium to at most approximately 10, more preferably to at most approximately 9, and most preferably to at most approximately 8.7. Preferably no ferric chloride is added to the aqueous medium and no further alteration of pH occurs after the adding steps. One or more of the sources of divalent metal ions may be sources of copper ions, preferably to provide a concentration in the aqueous medium of greater than or equal to approximately 1.0 mg/L, more preferably between approximately 1.5 and 2.5 mg/L, and most preferably between approximately 1.5 and 2.0 mg/L. One or more of the sources of divalent metal ions may be sources of zinc ions, preferably to provide a concentration in the aqueous medium of greater than or equal to approximately 0.5 mg/L, more preferably between approximately 0.5 and 3.0 mg/L, and most preferably between approximately 0.5 and 1.5 mg/L. Dissolved arsenate in the aqueous medium is reduced to a lower level than possible if only the step of adding lime were performed. The method may be employed in surface water treatment plants, wastewater treatment plants, plants for treating pumped groundwater, groundwater in situ remediation systems, water filters, or water softeners, and like facilities and apparatuses. The sources of divalent metal ions are preferably one or more of copper sulfate ($CuSO_4$, $CUSO_4.5H_2$), copper chloride ($CuCl_2$, $CuCl_2.H2O$), copper nitrate ($Cu(NO_3)_2.6H_2O$), copper acetate, zinc sulfate ($ZnSO_4$, $ZnSO_4.7H_2$), zinc chloride ($ZnCl_2$), zinc nitrate ($Zn(NO_3)_2.6H_2O$), and anhydrous zinc nitrate ($Zn(NO_3)_2$).

The present invention is also of a composition of matter for removing dissolved arsenic from an aqueous medium, the composition of matter comprising lime one or more sources of divalent metal ions selected from the group consisting of copper ions and zinc ions. The one or more sources of divalent metal ions are preferably one or more of copper sulfate ($CuSO_4$, $CUSO_4.5H_2$), copper chloride ($CuCl_2$, $CuCl_2.H2O$), copper nitrate ($Cu(NO_3)_2.6H_2O$), copper acetate, zinc sulfate ($ZnSO_4$, $ZnSO_4.7H_2$), zinc chloride ($ZnCl_2$), zinc nitrate ($Zn(NO_3)_2.6H_2O$), and anhydrous zinc nitrate ($Zn(NO_3)_2$). The composition is preferably in solid form, in form of a concentrated solution, or a combination.

The invention is further of an aqueous medium produced by addition of the composition of matter described above or by the process described above.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings:

FIG. 1 is a graph of residual arsenic concentration with fixed lime dosage of 10 mg/L and varying Cu salt dose; and FIG. 2 is a graph of residual arsenic concentration with fixed lime dosage of 10 mg/L and varying Zn salt dose.

DESCRIPTION OF THE PREFERRED EMBODIMENTS (BEST MODES FOR CARRYING OUT THE INVENTION)

The present invention is of enhanced arsenic removal in lime softening via addition of zinc and/or copper ions. Addition of trace amounts of divalent ions other than calcium or magnesium—most preferably $Cu^{2+}$ and/or $Zn^{2+}$—to calcium carbonate surfaces causes an increase in its arsenate adsorption capacity. Low-cost arsenic removal can therefore be achieved by lime softening at relatively low pH at which minor calcium carbonate precipitation and no magnesium hydroxide precipitation occur. The invention results in less solid waste and avoids the costs of pH adjustment (up and down) and ferric chloride addition Throughout the specification and claims, "lime" is defined to include both CaO (quicklime) and $Ca(OH)_2$ (hydrated lime). The divalent metal cation modifier can comprise any water-soluble compound that releases free divalent cations when dissolved in water. The divalent metal cation modifier can comprise, for example, any water-soluble copper compound that releases free $Cu^{2+}$ cations when dissolved in water (e.g., copper sulfate ($CuSO_4$, $CuSO_4.5H_2$); copper chloride ($CuCl_2$, $CuCl_2.H2O$); copper nitrate ($Cu(NO_3)_2.6H_2O$); and copper acetate, or combinations thereof). Alternatively, the divalent metal cation modifier can comprise any water-soluble zinc compound that releases free $Zn^{2+}$ cations when dissolved in water (e.g., zinc sulfate ($ZnSO_4$, $ZnSO_4.7H_2$); zinc chloride ($ZnCl_2$); zinc nitrate ($Zn(NO_3)_2.6H_2O$); and anhydrous zinc nitrate ($Zn(NO_3)_2$), or combinations thereof).

The preferred concentration of zinc is at or above approximately 0.5 mg/L, more preferred is at or between approximately 0.5 and 3.0 mg/L, and most preferred is at or between approximately 0.5 and 1.5 mg/L. The preferred concentration of copper is at or above approximately 1 0 mg/L, more preferred is at or between approximately 1.5 and 2.5 mg/L, and most preferred is at or between approximately 1.5 and 2.0 mg/L.

A cost-effective arsenic removal technology results from using lime-softening with Cu and/or Zn additions with a relatively low target pH value of approximately 8.7. Treatment at a lower pH has the added benefit that post-treatment pH adjustment is either unnecessary or relatively minor. Also the ability to remove arsenic without complete precipitation of calcium carbonate and magnesium hydroxide minimizes the amount of waste generated in terms of waste sludge and/or filter backwash water.

Systems employing the invention can range from large surface water or wastewater treatment plants, plants for treating pumped groundwater, in situ in subsurface groundwater, water filters, water softeners, and like water remediation systems. The invention may be combined with other known arsenic removal processes, including coagulation and microfiltration.

Compositions of matter of the invention can take one of several forms, including: (1) lime mixed with the divalent metal ion source or sources; (2) lime and a separate concentrated solution of divalent metal ions; (3) divalent metal ion source or sources and a separate concentrated solution of lime; and (4) a concentrated solution of lime and divalent metal ions.

INDUSTRIAL APPLICABILITY

The invention is further illustrated by the following non-limiting example.

EXAMPLE

A series of experiments were conducted using a lime-softening process augmented with $Cu^{2+}$ or $Zn^{2+}$ ions to remove arsenic from Albuquerque, N. Mex. groundwater spiked with pentavalent arsenic.

Two jar tests were employed using arsenic(V)-spiked Albuquerque tap water. The final arsenic concentration of the spiked water was 87.0 ppb. Each jar was dosed with CaO to pH=8.72±0.06. One jar served as a control and contained no divalent metal ion. All other jars in a test run were dosed with varying concentrations of either copper sulfate or zinc nitrate (see Table 1) The contents of each jar were then rapidly mixed for 3 minutes and then slow mixed for 45 minutes At the end of the slow mixing samples were filtered through a 0.2-micrometer filter using a syringe filter assembly and then analyzed for arsenic using a graphite furnace atomic adsorption spectrophotometer. The residual dissolved arsenic concentrations are included in Table 1 and plotted in FIGS. 1 and 2 against the amount of divalent metal salts added.

TABLE 1

Concentration variations of calcium oxide and divalent metal salt and residual arsenic(V) concentrations, initial As concentration = 87 ppb.

| Test Run No:/Jar No: | CaO (mg/L) | $CuSO_4$ (mg/L) | $ZnNO_3$ (mg/L) | Residual As(V) (ppb) |
|---|---|---|---|---|
| Copper dosage run | | | | |
| Run-1/Jar-1 (control) | 10.0 | 0.0 | 0.0 | 41.05 |
| Run-1/Jar-2 | 10.0 | 0.5 | 0.0 | 40.38 |
| Run-1/Jar-3 | 10.0 | 1.0 | 0.0 | 36.44 |
| Run-1/Jar-4 | 10.0 | 2.0 | 0.0 | 32.50 |
| Run-1/Jar-5 | 10.0 | 2.5 | 0.0 | 33.54 |
| Run-1/Jar-6 | 10.0 | 3.0 | 0.0 | 33.01 |
| Zinc dosage run | | | | |
| Run-2/Jar-1 (control) | 10.0 | 0.0 | 0.0 | 47.52 |
| Run-2/Jar-2 | 10.0 | 0.0 | 0.5 | 38.39 |
| Run-2/Jar-3 | 10.0 | 0.0 | 1.0 | 29.26 |
| Run-2/Jar-4 | 10.0 | 0.0 | 2.0 | 31.81 |
| Run-2/Jar-5 | 10.0 | 0.0 | 2.5 | 31.78 |
| Run-2/Jar-6 | 10.0 | 0.0 | 3.0 | 29.36 |

Adding copper or zinc to the lime-softening process significantly enhances the removal of arsenic from water. Addition of 2 0 mg/l of copper salt to a fixed lime dose of 10.0 mg/L at the pH of 8 69±0.06 produced an increase in arsenic removal efficiency by 10% relative to the control. Zinc enhanced lime softening at the pH of 8.74±0.04 even more, increasing the arsenic removal by 21% relative to the control.

The preceding example can be repeated with similar success by substituting the generically or specifically described reactants and/or operating conditions of this invention for those used in the preceding examples.

Although the invention has been described in detail with particular reference to these preferred embodiments, other embodiments can achieve the same results Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method for removing dissolved arsenic from an aqueous medium, the method comprising the steps of:

adding lime to the aqueous medium, wherein the step of adding lime increases the pH of the aqueous medium to at most approximately 10; and adding one or more sources of divalent metal ions other than calcium and magnesium to the aqueous medium wherein said metal ions comprise one or more sources of copper ions or zinc ions;

wherein substantially no ferric ions are added to the aqueous medium; and whereby dissolved arsenic in the aqueous medium is reduced to a lower level than possible if only the step of adding lime were performed.

2. The method of claim 1 wherein the step of adding lime increases pH of the aqueous medium to at most approximately 9.

3. The method of claim 2 wherein the step of adding lime increases pH of the aqueous medium to at most approximately 8.7.

4. The method of claim 1 wherein substantially no further alteration of pH occurs after the adding steps.

5. The method of claim 1 wherein the steps of adding one or more sources of divalent metal ions comprises adding one or more sources of copper ions.

6. The method of claim 5 wherein the step of adding one or more sources of copper ions to provide a concentration in the aqueous medium of greater than or equal to approximately 1.0 mg/L.

7. The method of claim 6 wherein the step of adding one or more sources of copper ions to provide a concentration in the aqueous medium of at or between approximately 1.5 and 2.5 mg/L.

8. The method of claim 7 wherein the step of adding one or more sources of copper ions to provide a concentration in the aqueous medium of at or between approximately 1.5 and 2.0 mg/L.

9. The method of claim 1 wherein the step of adding one or more sources of divalent metal ions comprises adding one or more sources of zinc ions.

10. The method of claim 9 wherein the step of adding one or more sources of zinc ions to provide a concentration in the aqueous medium of greater than or equal to approximately 0.5 mg/L.

11. The method of claim 10 wherein the step of adding one or more sources of zinc ions to provide a concentration in the aqueous medium of at or between approximately 0.5 and 3.0 mg/L.

12. The method of claim 11 wherein the step of adding one or more sources of zinc ions to provide a concentration in the aqueous medium of at or between approximately 0.5 and 1.5 mg/L.

13. The method of claim 1 whereby dissolved arsenate in the aqueous medium is reduced to a lower level than possible if only the step of adding lime were performed.

14. The method of claim 1 additionally comprising the step of conducting the adding steps in an apparatus selected from the group consisting of surface water treatment plants, wastewater treatment plants, plants for treating pumped groundwater, groundwater in situ remediation systems, water filters, and water softeners.

15. The method of claim 1 wherein the step of adding one or more sources of divalent metal ions comprises adding one or more of the group consisting of copper sulfate ($CuSO_4$, $CuSO_4.5H_2$), copper chloride ($CuCl_2$, $CuCl_2.H_2O$), copper nitrate ($Cu(NO_3)_2.6H_2O$), copper acetate, zinc sulfate ($ZnSO_4$, $ZnSO_4.7H_2$), zinc chloride ($ZnCl_2$), zinc nitrate ($Zn(NO_3)_2.6H_2O$), and anhydrous zinc nitrate ($Zn(NO_3)_2$).

16. A method for removing dissolved arsenic from an aqueous medium, the method consisting essentially of the steps of:

adding lime to the aqueous medium, wherein the step of adding lime increases the pH of the aqueous medium to at most approximately 10; and adding one or more sources of divalent metal ions other than calcium and magnesium to the aqueous medium wherein said metal ions comprise one or more sources of copper ions or zinc ions;

whereby dissolved arsenic in the aqueous medium is reduced to a lower level than possible if only the step of adding lime were performed.

17. The method of claim 16 wherein the step of adding lime increases pH of the aqueous medium to at most approximately 9.

18. The method of claim 17 wherein the step of adding lime increases pH of the aqueous medium to at most approximately 8.7.

19. The method of claim 16 wherein substantially no further alteration of pH occurs after the adding steps.

20. The method of claim 16 wherein the step of adding one or more sources of divalent metal ions comprises adding one or more sources of copper ions.

21. The method of claim 20 wherein the step of adding one or more sources of copper ions to provide a concentration in the aqueous medium of greater than or equal to approximately 1.0 mg/L.

22. The method of claim 21 wherein the step of adding one or more sources of copper ions to provide a concentration in the aqueous medium of at or between approximately 1.5 and 2.5 mg/L.

23. The method of claim 22 wherein the step of adding one or more sources of copper ions to provide a concentration in the aqueous medium of at or between approximately 1.5 and 2.0 mg/L.

24. The method of claim 16 wherein the step of adding one or more sources of divalent metal ions comprises adding one or more sources of zinc ions.

25. The method of claim 24 wherein the step of adding one or more sources of zinc ions to provide a concentration in the aqueous medium of greater than or equal to approximately 0.5 mg/L.

26. The method of claim 25 wherein the step of adding one or more sources of zinc ions to provide a concentration in the aqueous medium of at or between approximately 0.5 and 3.0 mg/L.

27. The method of claim 26 wherein the step of adding one or more sources of zinc ions to provide a concentration in the aqueous medium of at or between approximately 0.5 and 1.5 mg/L.

28. The method of claim 16 whereby dissolved arsenate in the aqueous medium is reduced to a lower level than possible if only the step of adding lime were performed.

29. The method of claim 16 wherein the adding steps are conducted in an apparatus selected from the group consisting of surface water treatment plants, wastewater treatment plants, plants for treating pumped groundwater, groundwater in situ remediation systems, water filters, and water softeners.

30. The method of claim 16 wherein the step of adding one or more sources of divalent metal ions comprises adding one or more of the group consisting of copper sulfate ($CuSO_4$, $CuSO_4.5H_2$), copper chloride ($CuCl_2$, $CuCl_2.H2O$), copper nitrate ($Cu(NO_3)_2.6H_2O$), copper acetate, zinc sulfate ($ZnSO_4$, $ZnSO_4.7H_2$), zinc chloride ($ZnCl_2$), zinc nitrate ($Zn(NO_3)_2.6H_2O$), and anhydrous zinc nitrate ($Zn(NO_3)_2$).

* * * * *